(12) United States Patent
Yoshii et al.

(10) Patent No.: US 11,073,984 B2
(45) Date of Patent: Jul. 27, 2021

(54) DEVICE AND METHOD FOR DISPLAYING INFORMATION

(71) Applicant: Furuno Electric Co., Ltd., Nishinomiya (JP)

(72) Inventors: Hiroshi Yoshii, Nishinomiya (JP); Tatsuya Asahara, Kobe (JP)

(73) Assignee: FURUNO ELECTRIC CO., LTD., Nishinomiya (JP)

( * ) Notice: Subject to any disclaimer, the term of this patent is extended or adjusted under 35 U.S.C. 154(b) by 0 days.

(21) Appl. No.: 16/828,975

(22) Filed: Mar. 25, 2020

(65) Prior Publication Data

US 2020/0333946 A1    Oct. 22, 2020

(30) Foreign Application Priority Data

Apr. 16, 2019 (JP) ................... JP2019-077878

(51) Int. Cl.
| | |
|---|---|
| *G06F 3/0488* | (2013.01) |
| *G01C 21/20* | (2006.01) |
| *G06F 3/0482* | (2013.01) |
| *G06F 3/0484* | (2013.01) |

(52) U.S. Cl.
CPC ....... *G06F 3/04883* (2013.01); *G01C 21/203* (2013.01); *G06F 3/0482* (2013.01); *G06F 3/04845* (2013.01)

(58) Field of Classification Search
CPC .................................................. G06F 3/04883
USPC ........................................................ 715/810
See application file for complete search history.

(56) References Cited

U.S. PATENT DOCUMENTS

| | | | | |
|---|---|---|---|---|
| 5,920,694 A | * | 7/1999 | Carleton | ............. H04L 12/1822 709/205 |
| 8,601,401 B2 | * | 12/2013 | Coleman | ................. G06F 3/038 715/858 |
| 9,329,679 B1 | * | 5/2016 | Shepard | ................ G06F 3/1431 |
| 10,126,943 B2 | * | 11/2018 | Kim | .................... G06F 3/04842 |
| 10,147,115 B1 | * | 12/2018 | Bidarkar | ........... G06Q 30/0246 |
| 10,580,307 B2 | * | 3/2020 | Yoshikawa | ............... G01S 7/10 |
| 2002/0053983 A1 | * | 5/2002 | Chamas | ............... G01C 23/005 340/945 |
| 2002/0054141 A1 | * | 5/2002 | Yen | .......................... G09G 5/14 715/804 |
| 2005/0270311 A1 | * | 12/2005 | Rasmussen | ............ G09B 29/10 345/677 |
| 2006/0139375 A1 | * | 6/2006 | Rasmussen | ............. G06F 16/29 345/641 |

(Continued)

FOREIGN PATENT DOCUMENTS

WO        2013/121458 A1    8/2013

*Primary Examiner* — Reza Nabi
(74) *Attorney, Agent, or Firm* — Xsensus LLP

(57) ABSTRACT

An information display device includes a touch position and processing circuitry. The touch position detector is configured to detect a touched position of a screen. The processing circuitry is configured to acquire a plurality of information, display the plurality of acquired information on a plurality of display areas dividing the screen, respectively, display a change icon on one of the plurality of display areas, and sequentially change the plurality of information assigned as changeable information in the one display area where the change icon is displayed, each time the touched position of the screen is detected at a position where the change icon is displayed.

19 Claims, 9 Drawing Sheets

(56) References Cited

U.S. PATENT DOCUMENTS

| | | | | |
|---|---|---|---|---|
| 2007/0088497 | A1* | 4/2007 | Jung | G01C 21/3679 348/113 |
| 2007/0157094 | A1* | 7/2007 | Lemay | G06F 3/0483 715/717 |
| 2007/0260986 | A1* | 11/2007 | Cristofoli | H04N 21/4316 715/722 |
| 2009/0015674 | A1* | 1/2009 | Alley | H04N 7/185 348/144 |
| 2009/0150823 | A1* | 6/2009 | Orr | G06F 3/0481 715/788 |
| 2010/0005419 | A1* | 1/2010 | Miichi | G06F 3/0362 715/828 |
| 2010/0199225 | A1* | 8/2010 | Coleman | G06F 3/038 715/858 |
| 2010/0275683 | A1* | 11/2010 | Jia | G06F 1/1684 73/170.14 |
| 2011/0083103 | A1* | 4/2011 | Shim | G06F 1/1694 715/810 |
| 2012/0256929 | A1* | 10/2012 | Koenig | G06F 1/1647 345/503 |
| 2015/0025718 | A1* | 1/2015 | Miichi | G06F 3/0486 701/21 |
| 2016/0162145 | A1* | 6/2016 | Rivers | G01C 21/12 715/769 |
| 2016/0224213 | A1* | 8/2016 | Chen | G06F 3/017 |
| 2019/0130876 | A1* | 5/2019 | Nishida | G01S 7/62 |
| 2020/0019364 | A1* | 1/2020 | Pond | A45C 5/03 |
| 2020/0333946 | A1* | 10/2020 | Yoshii | G06F 3/0482 |

* cited by examiner

| APPLICATION | INFORMATION SOURCE | CONSTANT ACTIVATION |
|---|---|---|
| CHART PLOTTER | PLOTTER DEVICE | NOT NEEDED |
| RADAR | RADAR DEVICE | NEEDED |
| FISH FINDER | FISH FINDER | NEEDED |
| CAMERA | CAMERA | NOT NEEDED |
| WEATHER | RADIO COMMUNICATING DEVICE | NOT NEEDED |
| METER | NAUTICAL INSTRUMENT | NOT NEEDED |
| MULTIPLE FISH FINDER | FISH FINDER | NEEDED |
| SIDE SCAN | FISH FINDER | NEEDED |
| CROSS SECTION | FISH FINDER | NOT NEEDED |
| 3D HISTORY | FISH FINDER | NEEDED |

FIG. 4

INFORMATION DISPLAY TABLE

| DISPLAY AREA | APPLICATION |
|---|---|
| FIRST DISPLAY AREA | CHART PLOTTER |
| SECOND DISPLAY AREA | RADAR |
| THIRD DISPLAY AREA (CHANGEABLE) | FISH FINDER |
| | CAMERA |
| | WEATHER |
| | ⋮ |

FIG. 6

DEVICE AND METHOD FOR DISPLAYING INFORMATION

CROSS-REFERENCE TO RELATED APPLICATION(S)

This application claims priority under 35 U.S.C. § 119 to Japanese Patent Application No. 2019-077878, which was filed on Apr. 16, 2019, the entire disclosure of which is hereby incorporated by reference.

TECHNICAL FIELD

The present disclosure relates to a device, method and program for displaying information.

BACKGROUND

WO2013/121458A1 discloses an information display device and an information display method which displays an information display area and an icon, and creates an information display layout by a user dragging the icon to the information display area.

It is required for the information display device installed in a ship etc. to promptly display desired information.

SUMMARY

The present disclosure is made in view of the above situation, and one purpose thereof is to provide a device, method, and program for displaying information, capable of promptly displaying desired information.

According to one aspect of the present disclosure, an information display device is provided, which includes a touch position and processing circuitry. The touch position detector is configured to detect a touched position of a screen. The processing circuitry is configured to acquire a plurality of information comprising some of navigational information acquired from a plotter device configured to plot a position of a ship on a nautical chart, radar information acquired from a radar device, underwater detection information acquired from a fish finder, image information acquired from a camera, weather information acquired from a weather observation device or the Internet, and metered information acquired from a nautical instrument, display the plurality of acquired information on a plurality of display areas dividing the screen, respectively, display a change icon on one of the plurality of display areas, and sequentially change the plurality of information assigned as changeable information in the one display area where the change icon is displayed, each time the touched position of the screen is detected at a position where the change icon is displayed.

The processing circuitry may be further configured to keep an application program running to generate an image of the changeable information among a plurality of application programs also during a period where the image of the changeable information is not displayed in the one display area.

The processing circuitry may be further configured to manage a running status of the plurality of application programs.

The processing circuitry may be further configured to accept a selection of the changeable information from the plurality of information, and set an upper limit to the number of selections of the information corresponding to the application programs that does not always need to be activated.

The processing circuitry may be further configured to accept a selection of the changeable information from the plurality of information, and eliminate a selection of the information same as the information displayed on the display area, wherein the plurality of application programs include an application program that does not always need to be activated.

According to the present disclosure, the desired information is displayed promptly.

BRIEF DESCRIPTION OF DRAWINGS

The present disclosure is illustrated by way of example and not by way of limitation in the figures of the accompanying drawings, in which like reference numerals indicate like elements and in which:

FIG. 4 is a view illustrating one example of application software;

FIG. 6 is a view illustrating one example of contents of an information display table;

DETAILED DESCRIPTION

Hereinafter, one embodiment of the present disclosure is described with reference to the accompanying drawings.

Figure 1:
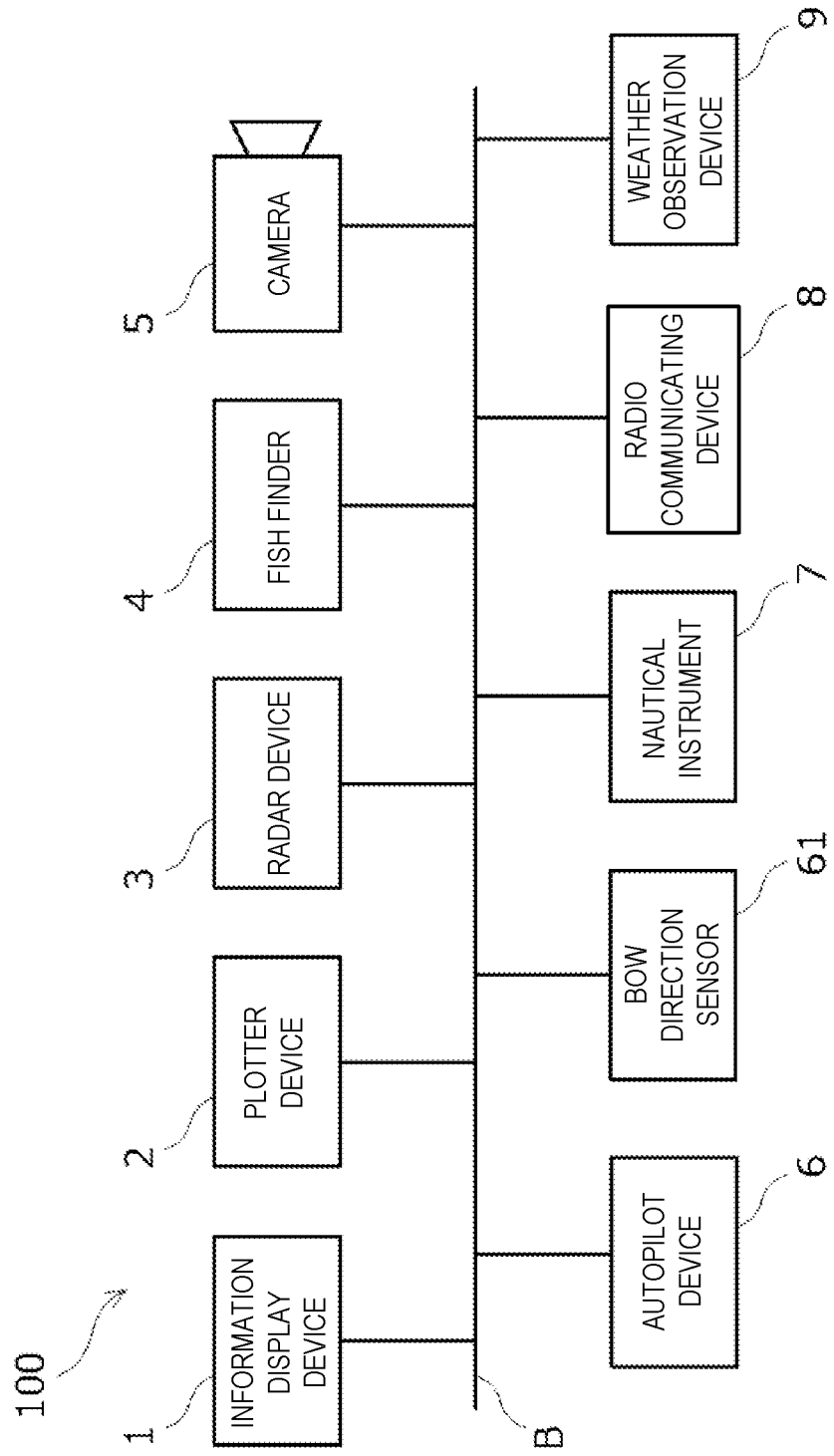
FIG. 1 is a view illustrating one example of a configuration of an information display system according to one embodiment.

FIG. 1 is a view illustrating one example of a configuration of an information display system 100 according to one embodiment. The information display system 100 is mounted, for example, on a ship. Note that the present disclosure may be applied to ships which typically travel on water or sea which are referred to as surface ships, and may also be applied to other types of ships including boats, dinghies, watercrafts, and vessels. Further, the present disclosure may also be applied, if applicable, to submarines, aircrafts, and spaceships, as well as any types of vehicles which travel on the ground, such as automobiles, motorcycles, and ATVs.

The information display system 100 may include an information display device 1, a plotter device 2, a radar device 3, a fish finder 4, a camera 5, an autopilot device 6, a bow direction sensor 61, a nautical instrument 7, a radio communicating device 8, and a weather observation device 9. These devices may be connected to a network B, such as CAN (Controller Area Network) or LAN (Local Area Network) so that network intercommunication is possible.

The plotter device 2 may calculate the position of the ship based on radio waves received from a GNSS (Global Navigation Satellite System), and plot the position of the ship on a nautical chart. The plotter device 2 may transmit plot chart information acquired by plotting the position of the ship on the nautical chart to the information display device 1.

The plotter device 2 may calculate a direction (bearing) of a target point with respect to the position of the ship based on the position of the ship plotted on the nautical chart and a target point set by a user on the nautical chart, and then transmit it to the autopilot device 6. That is, the plotter device 2 may also function as a navigation device.

The radar device 3 may emit a microwave from an antenna and receive a reflection wave thereof, and then generate radar information based on the received signal. The radar information may include a distance and a direction (bearing) of a target object which exists around the ship. The radar device 3 may transmit the generated radar information to the information display device 1.

The fish finder 4 may emit an ultrasonic wave underwater from an ultrasonic transducer installed in the bottom of the ship and receive a reflection wave thereof, and then generate underwater detection information based on the received signal. The underwater detection information may include information on an underwater school of fish and a seabed. The fish finder 4 may transmit the generated underwater detection information to the information display device 1.

The camera 5 may be installed, for example, so as to be directed outboard, and generate image information indicative of a situation of outboard. The image information is, for example, a video data. The camera 5 may transmit the generated image information to the information display device 1.

The autopilot device 6 may calculate a target steering angle for directing a bow of the ship to the target point based on the direction (bearing) of a bow of the ship acquired from the bow direction sensor 61, such as a GPS compass or a magnetic compass, and a direction (bearing) of the target point acquired from the plotter device 2, and then drive a steering mechanism so that a steering angle of the steering mechanism approaches the target steering angle.

The nautical instrument 7 may be an instrument used for navigation of the ship, such as a ship speed meter and an anemometer, and transmit metered information, such as ship speed information, and wind direction and wind speed information, to the information display device 1. Moreover, the bow direction sensor 61 may also be a kind of the nautical instrument 7, and may transmit the directional information to the information display device 1.

Note that, although the plotter device 2, the radar device 3, the fish finder 4, etc. may also be regarded as kinds of the nautical instrument 7, they may be treated as instruments different from the nautical instrument 7.

The radio communicating device 8 may be comprised of a mobile communication module or a satellite communication module, which accesses MICS (Maritime Information and Communication System) through the Internet to acquire information, such as weather information. The radio communicating device 8 may transmit the acquired weather information to the information display device 1. The weather information may be acquired by the weather observation device 9.

Figure 2:
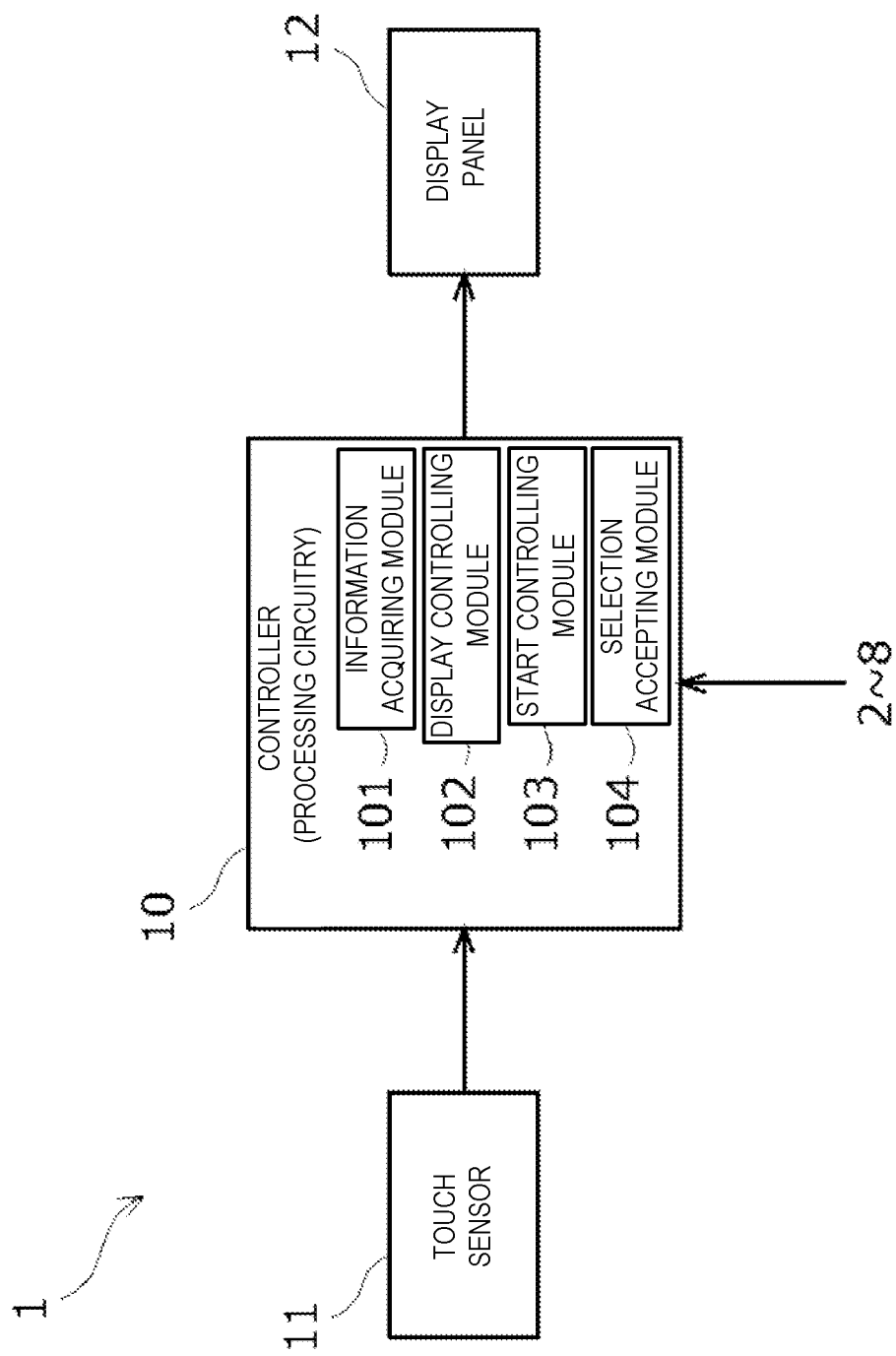
FIG. 2 is a block diagram illustrating one example of a configuration of an information display device according to one embodiment.
Figure 3:
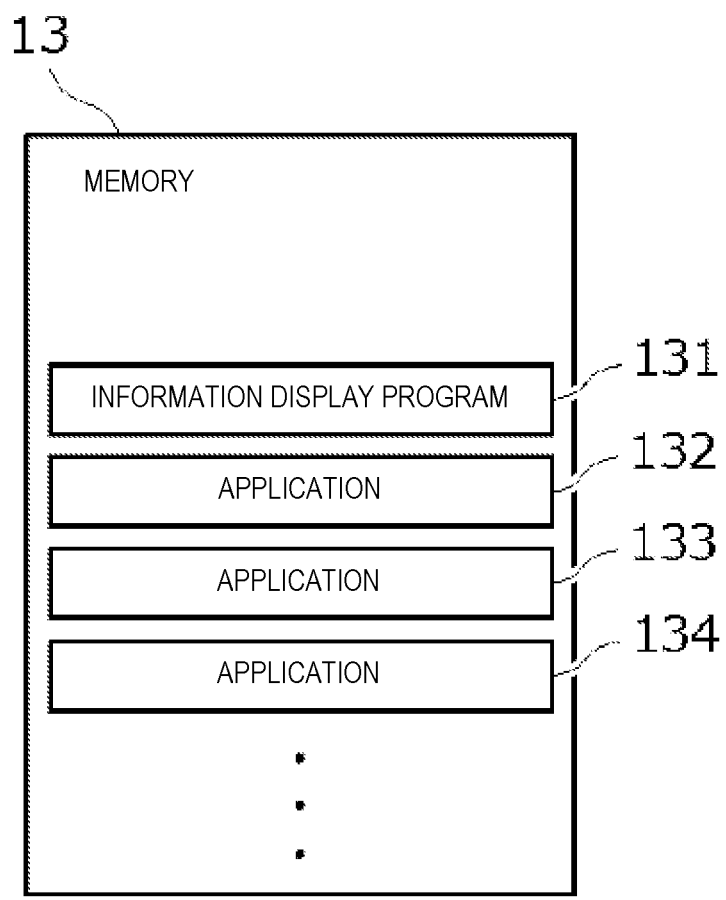
FIG. 3 is a view illustrating one example of contents of a memory of the information display device.

FIG. 2 is a block diagram illustrating one example of a configuration of the information display device 1 according to one embodiment. FIG. 3 is a view illustrating one example of contents of a memory 13 of the information display device 1. The information display device 1 may include a controller (which is also referred to as processing circuitry) 10, a touch sensor 11 (one example of a "touch position detector"), and a display panel 12.

The controller 10 may be a computer including a CPU, a RAM, a ROM, a nonvolatile memory, and an input/output interface. The memory 13 may be the ROM or the nonvolatile memory included in the controller 10.

The touch sensor 11 is, for example, a capacitive sensing touch sensor, which may detect a position at which a user touches on a screen of the display panel 12 and then output the detected signal to the controller 10. The display panel 12 is, for example, a liquid crystal display, which may display on the screen an image according to a display instruction from the controller 10.

The memory 13 may store an information display program 131 and a plurality of application programs 132-134. In the following description, the application program may be abbreviated as "application."

Each program stored in the memory 13 may be provided through an information storage medium, such as an optical disc or a memory card, or may be provided through a communication network, such as the Internet.

The CPU of the controller 10 may function as an information acquiring module 101, a display controlling module 102, a start controlling module 103, and a selection accepting module 104 by executing information processing according to the information display program 131 loaded to the RAM from the memory 13.

The information acquiring module 101 may acquire a variety of information from the plotter device 2, the radar device 3, the fish finder 4, the camera 5, the nautical instrument 7, the radio communicating device 8, etc. (see FIG. 1).

The display controlling module 102 may generate a display instruction for displaying an information display screen 90 (see FIG. 5), a setting accepting screen 95 (see FIG. 8), etc., which will be described later, on the screen of the display panel 12, and then output them to the display panel 12.

The start controlling module 103 may manage a startup of each of the applications 132-134 stored in the memory 13. The applications 132-134 may be programs for generating an image (hereinafter, referred to as a "screen element") to be displayed on the screen of the display panel 12 based on the information acquired by the information acquiring module 101.

FIG. 4 is a view illustrating one example of the applications. For example, a "chart plotter" application generates the screen element (see a first display area 91 of FIG. 5) indicative of plot chart information acquired from the plotter device 2.

A "radar" application may generate the screen element (see a second display area 92 of FIG. 5) indicative of a radar image based on the radar information acquired from the radar device 3. A "fish finder" application may generate the screen element (see a third display area 93 of FIG. 5) indicative of a fish finder image based on the underwater detection information acquired from the fish finder 4.

A "camera" application may generate the screen element indicative of the image information acquired from the camera 5. A "weather" application may generate the screen element indicative of the weather information acquired from the radio communicating device 8 or the weather observation device 9. A "meter" application may generate the screen element indicative of the metered information acquired from the nautical instrument 7.

A "multiple fish finder" application may generate the screen element indicative of fish finder images in multiple directions based on the underwater detection information generated based on the ultrasonic waves emitted from the fish finder 4 toward not only directly under the ship but also a lower left direction and a lower right direction.

A "side scan" application may generate the screen element indicative of an image of an underwater structure based on the underwater detection information generated based on the ultrasonic waves emitted from the fish finder 4 to the lower left direction and the lower right direction.

A "cross section" application may generate the screen element indicative of an image of the signs of fish and the seabed shape at that moment based on the underwater detection information generated based on the ultrasonic waves broadly emitted to the left and right from the fish finder 4.

A "3D history" application may generate the screen element indicative of a 3D (three-dimensional) image of the signs of fish and the seabed shape based on the underwater detection information generated based on the ultrasonic waves broadly emitted to the left and right from the fish finder 4.

Note that the applications may include a normally-activated application which always needs to be operated, and a normally-deactivated application which does not always need to be operated.

For example, the "radar" application may have a function for displaying current radar echo information, and for displaying past radar echo information (a so-called "trace") so as to be superimposed on the current radar echo information. In order to record the trace, the "radar" application is necessary to be always operated or activated.

Moreover, in order to generate the screen element while utilizing not only the current underwater detection information but also the past underwater detection information, it is necessary to always operate the "fish finder" application, the "multiple fish finder" application, the "side scan" application, and the "3D history" application.

[Display Control]

Figure 5:
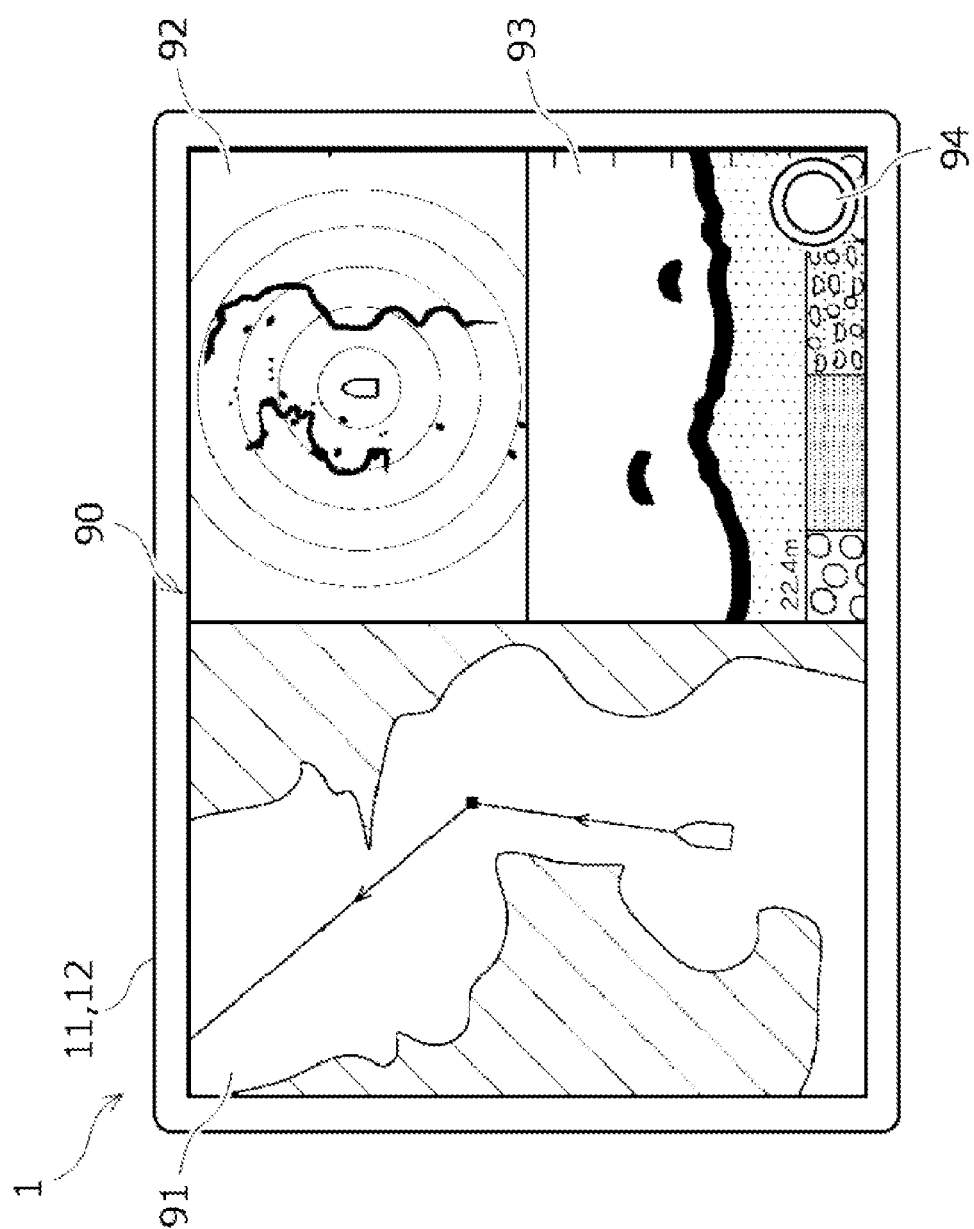
FIG. 5 is a view illustrating one example of display of an information display screen.

FIG. 5 is a view illustrating one example of the information display screen 90 displayed on the screen of the information display device 1. FIG. 6 is a view illustrating one example of contents of an information display table for displaying the information display screen 90. The information display table may be stored in the RAM of the controller 10.

As illustrated in FIG. 5, the information display screen 90 may be divided into a plurality of display areas 91-93. Each display area 91-93 may be an area where the screen element generated by one application selected from the plurality of applications 132-134 is displayed (see FIG. 3).

The divided mode and the number of divisions of the display areas 91-93 in the information display screen 90 are not limited to the illustrated example. For example, the divided mode and the number of divisions of the display areas 91-93 may be changeable by the user.

The third display area 93 among the plurality of display areas 91-93 may be a changeable display area where the displayed information is changeable (hereinafter, may be referred to as a "changeable display area 93"). The changeable display area 93 may include, for example, a change icon 94 of a push-button shape. Note that the number of changeable display areas may be more than one, without being limited to one.

As illustrated in FIG. 6, the display area and the application are associated with each other in the information display table. The display areas 91 and 92 other than the changeable display area 93 are each associated with one application.

On the other hand, the changeable display area 93 is associated with a plurality of applications. Below, the plurality of applications associated with the changeable display area 93 may also be referred to as "changeable applications."

In the illustrated example, the "chart plotter" application is associated with the first display area 91, and the "radar" application is associated with the second display area 92. On the other hand, the "fish finder" application, the "camera" application, the "weather" application, etc. are associated with the changeable display area 93.

Figure 7:
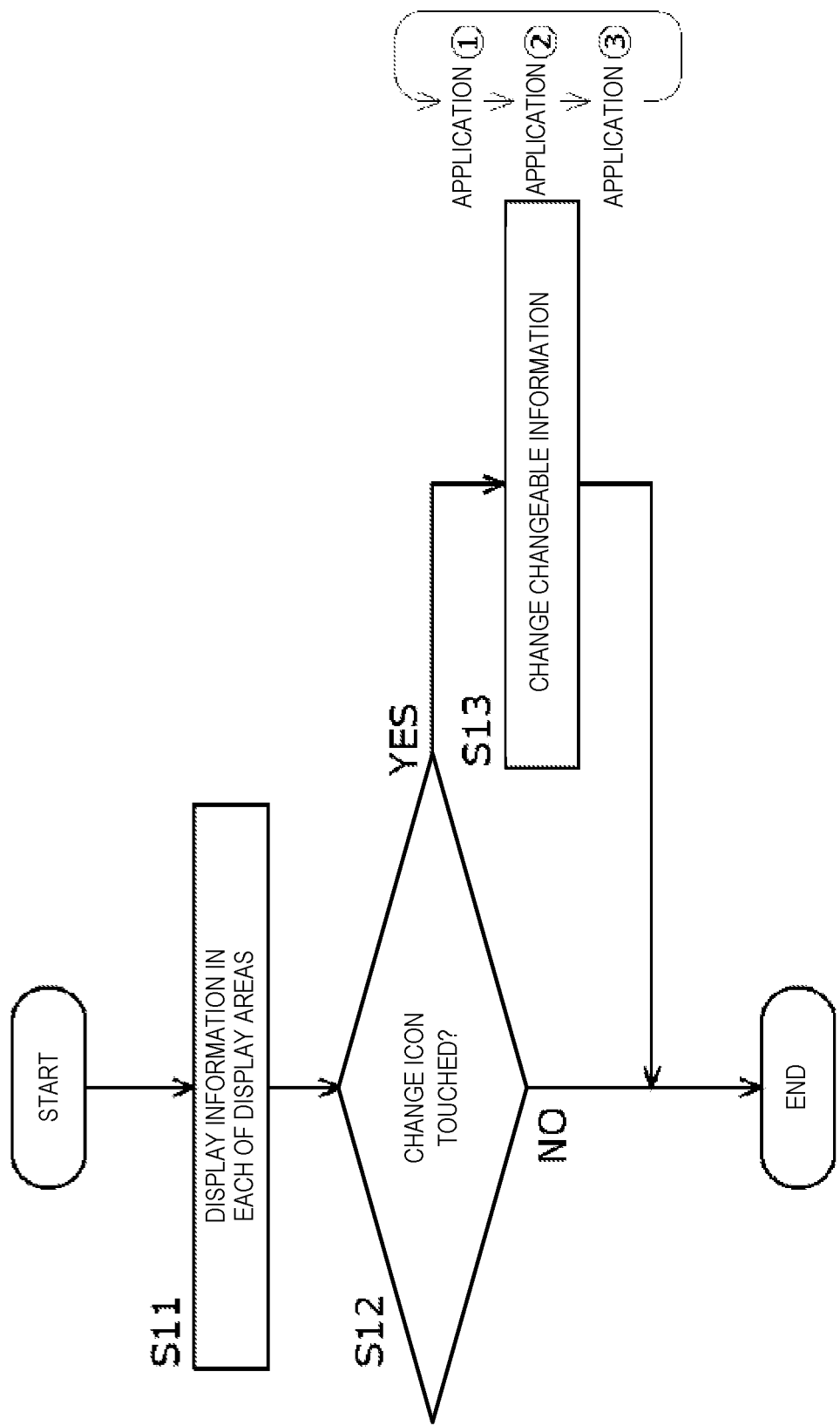
FIG. 7 is a flowchart illustrating one example of a procedure of a method of displaying information according to one embodiment.

FIG. 7 is a flowchart illustrating one example of a procedure of a method of displaying information according to one embodiment, which is implemented by the controller 10 of the information display device 1. The controller 10 may function as the display controlling module 102 by executing processing illustrated in this figure.

First, the controller 10 may display information in each of the areas 91-93 of the information display screen 90 (see FIG. 5) based on the information display table (see FIG. 6) (S11, processing as the display controlling module 102). Moreover, the controller 10 may display the change icon 94 in the changeable display area 93.

In detail, the screen elements generated by the applications associated with the respective areas 91-93 may be synthesized with the respective areas 91-93 of the information display screen 90. Note that the screen element generated by one of the plurality of changeable applications may be synthesized with the changeable display area 93.

At this time, the controller 10 may keep all the changeable applications associated with the changeable display area 93 activated also during a period where the applications are not displayed in the changeable display area 93 (processing as the start controlling module 103).

Next, when the controller 10 detects by the detected signal from the touch sensor 11 that the change icon 94 displayed in the changeable display area 93 is touched (S12: YES), it may change the information displayed in the changeable display area 93 (S13, processing as the display controlling module 102).

In detail, the screen element synthesized with the changeable display area 93 may be changed to the screen element generated by another changeable application. This change may be performed according to the order, for example, registered in the information display table (see FIG. 6), each time the change icon 94 is touched.

Therefore, by touching the change icon 94, the user can change the information displayed in the changeable display area 93 and display desired information promptly.

In particular, by keeping all the changeable applications associated with the changeable display area 93 activated also during the period where the applications are not displayed in the changeable display area 93, the information may be changeable quicker.

[Setting Acceptance]

Figure 8:
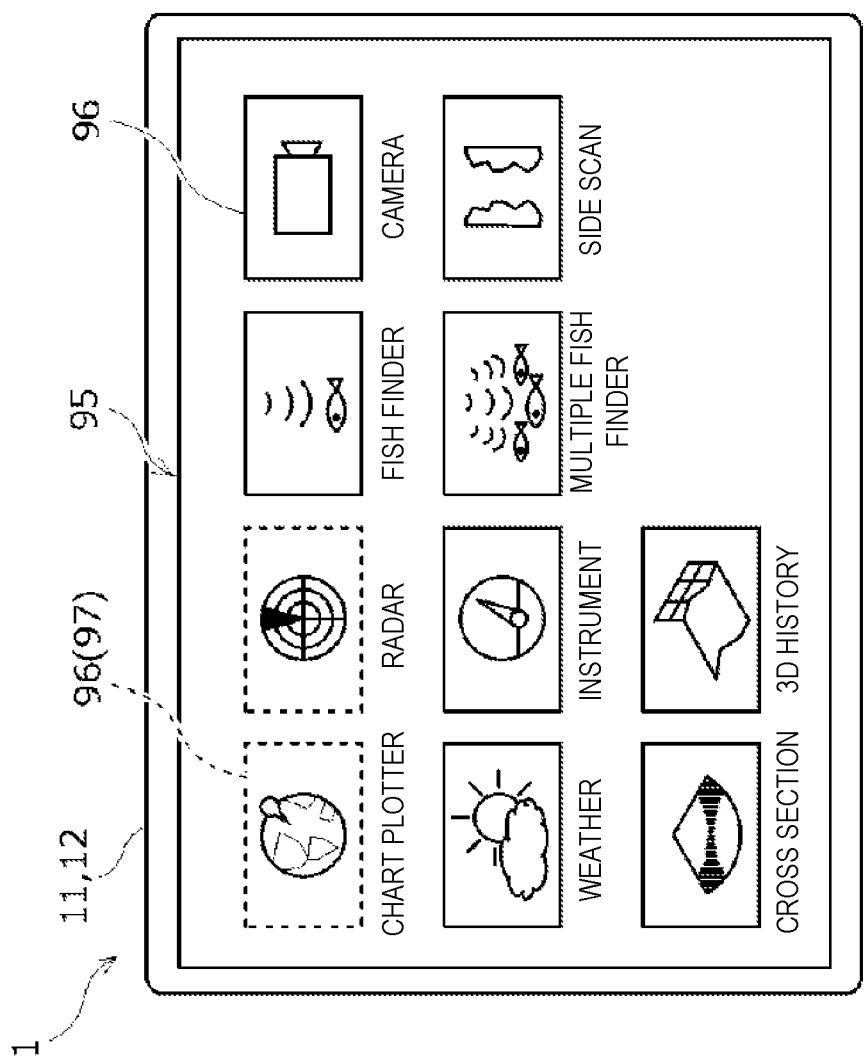
FIG. 8 is a view illustrating one example of display of a setting accepting screen.

FIG. 8 is a view illustrating one example of the setting accepting screen 95 displayed on the screen of the information display device 1. The setting accepting screen 95 may be a screen for accepting a selection of the information displayed in the changeable display area 93 of the information display screen 90 (see FIG. 5). The setting accepting screen 95 may include a plurality of application icons 96 which correspond to the plurality of applications, respectively.

Figure 9:
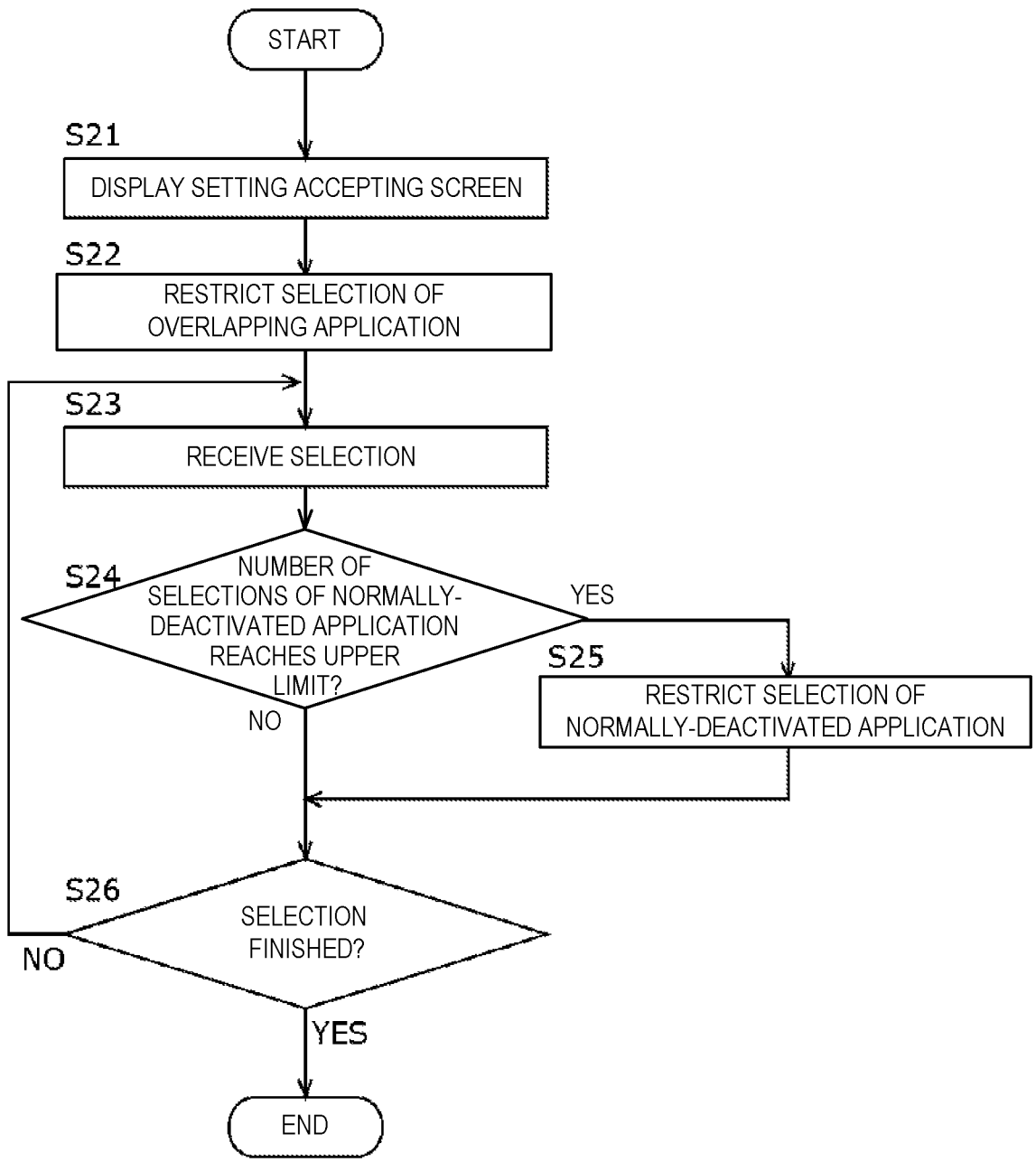
FIG. 9 is a flowchart illustrating one example of a procedure of a setting accepting processing.

FIG. 9 is a flowchart illustrating one example of a procedure of the method of displaying information according to one embodiment implemented by the controller 10 of the information display device 1. The controller 10 may function as the selection accepting module 104 by executing processing illustrated in this figure.

First, the controller 10 may display the setting accepting screen 95 (see FIG. 8) (S21). At this time, the controller 10 may restrict a selection of information which overlaps with the information displayed in the display areas 91 and 92 other than the changeable display area 93 of the information display screen 90 (see FIG. 5) (S22).

In detail, among the application icons 96 included in the setting accepting screen 95, the application icons 96 which overlap with the information displayed in the display areas 91 and 92 may be displayed as selection disabled icons 97 which cannot be selected. In the illustrated example, the "chart plotter" application icon 96 and the "radar" application icon 96 are displayed as the selection disabled icons 97.

Note that selections of the information displayed in the display areas 91 and 92 other than the changeable display area 93 can be accepted in another selection accepting screen (not illustrated) which is different from the setting accepting screen 95.

Next, the controller 10 may receive a selection of the information displayed in the changeable display area 93 (S23). The user may select the application icon 96 corresponding to desired information from the application icons 96 other than the selection disabled icons 97 by a touch.

When the application icon 96 is selected, the application corresponding to the selection may be associated with the changeable display area 93 in the information display table (see FIG. 6). For example, when the "fish finder" application icon 96 is selected, the "fish finder" application may be associated with the changeable display area 93 in the information display table.

Note that when the application icon 96 is selected, this application icon 96 may be changed to the selection disabled icon 97. Therefore, the overlapped information cannot be selected.

Next, the controller 10 may determine whether the number of selections of the normally-deactivated application which does not always need to be activated reaches an upper limit (S24). The upper limit of the number of selections may be defined, for example, beforehand according to the capacity of the RAM included in the controller 10.

As described above, since all the applications associated with the changeable display area 93 remain activated, when the number of activated normally-deactivated applications increases, the free space of the RAM may run short. Therefore, in this processing, the upper limit may be provided to the number of selections of the normally-deactivated application.

If the number of selections of the normally-deactivated application reaches the upper limit (S24: YES), the controller 10 may restrict the selection of the normally-deactivated application (S25). In detail, the application icons 96 corresponding to the normally-deactivated applications among the application icons 96 included in the setting accepting screen 95 may be displayed as the selection disabled icons 97.

Then, the controller 10 may end the series of processings after the selection is finished (S26).

As described above, although one embodiment of the present disclosure is described, it is needless to say that various changes and modifications of the present disclosure are possible for a person skilled in the art, without being limited to the embodiment described above.

For example, the number of activated normally-deactivated applications associated with the changeable display area 93 may dynamically be changed according to the utilizing capacity of the RAM. In detail, when the utilizing capacity of the RAM reaches a threshold, some or all of the active normally-deactivated applications associated with the changeable display area 93 may be terminated.

Terminology

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processor. A processor can be a microprocessor, but in the alternative, the processor can be a controlling module, microcontrolling module, or state machine, combinations of the same, or the like. A processor can include electrical circuitry configured to process computer-executable instructions. In another embodiment, a processor includes an application specific integrated circuit (ASIC), a field programmable gate array (FPGA) or other programmable device that performs logic operations without processing computer-executable instructions. A processor can also be implemented as a combination of computing devices, e.g., a combination of a digital signal processor (DSP) and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controlling module, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow views described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C. The same holds true for the use of definite articles used to introduce embodiment recitations. In addition, even if a specific number of an introduced embodiment recitation is explicitly recited, those skilled in the art will recognize that such recitation should typically be interpreted to mean at least the recited number (e.g., the bare recitation of "two recitations," without other modifiers, typically means at least two recitations, or two or more recitations).

It will be understood by those within the art that, in general, terms used herein, are generally intended as "open" terms (e.g., the term "including" should be interpreted as "including but not limited to," the term "having" should be interpreted as "having at least," the term "includes" should be interpreted as "includes but is not limited to," etc.).

For expository purposes, the term "horizontal" as used herein is defined as a plane parallel to the plane or surface of the floor of the area in which the system being described is used or the method being described is performed, regardless of its orientation. The term "floor" can be interchanged with the term "ground" or "water surface." The term "vertical" refers to a direction perpendicular to the horizontal as just defined. Terms such as "above," "below," "bottom," "top," "side," "higher," "lower," "upper," "over," and "under," are defined with respect to the horizontal plane.

As used herein, the terms "attached," "connected," "mated," and other such relational terms should be construed, unless otherwise noted, to include removable, moveable, fixed, adjustable, and/or releasable connections or attachments. The connections/attachments can include direct connections and/or connections having intermediate structure between the two components discussed.

Numbers preceded by a term such as "approximately," "about," and "substantially" as used herein include the recited numbers, and also represent an amount close to the stated amount that still performs a desired function or achieves a desired result. For example, the terms "approximately," "about," and "substantially" may refer to an amount that is within less than 10% of the stated amount. Features of embodiments disclosed herein are preceded by a term such as "approximately," "about," and "substantially" as used herein represent the feature with some variability that still performs a desired function or achieves a desired result for that feature.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. An information display device, comprising:
    a touch position detector configured to detect a touched position of a screen;
    a processor having a processing circuitry configured to:
    acquire a plurality of information comprising some of:
    navigational information acquired from a plotter device configured to plot a position of a ship on a nautical chart,
    radar information acquired from a radar device, underwater detection information acquired from a fish finder, image information acquired from a camera,
    weather information acquired from a weather observation device or the Internet, and
    metered information acquired from a nautical instrument, display the plurality of acquired information on a plurality of display areas dividing the screen, respectively
    display a change icon on one of the plurality of display areas, and sequentially change the plurality of information assigned as changeable information in the one display area where the change icon is displayed, each time the touched position of the screen is detected at a position where the change icon is displayed.

2. The information display device of claim 1, the processing circuitry is further configured to:
    keep an application program running to generate an image of the changeable information among a plurality of application programs also during a period where the image of the changeable information is not displayed in the one display area.

3. The information display device of claim 2, the processing circuitry is further configured to:
    manage a running status of the plurality of application programs.

4. The information display device of claim 3, wherein the plurality of application programs include an application program that does not always need to be activated, and
    the processing circuitry is further configured to:
    accept a selection of the changeable information from the plurality of information, and
    set an upper limit to the number of selections of the information corresponding to the application programs that does not always need to be activated.

5. The information display device of claim 3, the processing circuitry is further configured to:

accept a selection of the changeable information from the plurality of information, and eliminate a selection of the information same as the information displayed on the display area.

6. The information display device of claim 3, the processing circuitry is further configured to:

accept a selection of the changeable information from the plurality of information, and restrict a selection of the information same as the information displayed on the display area.

7. The information display device of claim 3, the processing circuitry is further configured to:

accept a selection of the changeable information from the plurality of information, and skip the information same as the information displayed on the display area each time the touched position of the screen is detected at the position where the change icon is displayed.

8. The information display device of claim 2, wherein the plurality of application programs include an application program that does not always need to be activated, and the processing circuitry is further configured to:

accept a selection of the changeable information from the plurality of information, and set an upper limit to the number of selections of the information corresponding to the application programs that does not always need to be activated.

9. The information display device of claim 8, the processing circuitry is further configured to:

accept a selection of the changeable information from the plurality of information, and eliminate a selection of the information same as the information displayed on the display area.

10. The information display device of claim 8, the processing circuitry is further configured to:

accept a selection of the changeable information from the plurality of information, and restrict a selection of the information same as the information displayed on the display area.

11. The information display device of claim 8, the processing circuitry is further configured to:

accept a selection of the changeable information from the plurality of information, and skip the information same as the information displayed on the display area each time the touched position of the screen is detected at the position where the change icon is displayed.

12. The information display device of claim 2, the processing circuitry is further configured to:

accept a selection of the changeable information from the plurality of information, and eliminate a selection of the information same as the information displayed on the display area.

13. The information display device of claim 2, the processing circuitry is further configured to:

accept a selection of the changeable information from the plurality of information, and restrict a selection of the information same as the information displayed on the display area.

14. The information display device of claim 2, the processing circuitry is further configured to:

accept a selection of the changeable information from the plurality of information, and skip the information same as the information displayed on the display area each time the touched position of the screen is detected at the position where the change icon is displayed.

15. The information display device of claim 1, the processing circuitry is further configured to:

accept a selection of the changeable information from the plurality of information, and eliminate a selection of the information same as the information displayed on the display area.

16. The information display device of claim 1, the processing circuitry is further configured to:

accept a selection of the changeable information from the plurality of information, and restrict a selection of the information same as the information displayed on the display area.

17. The information display device of claim 1, the processing circuitry is further configured to:

accept a selection of the changeable information from the plurality of information, and skip the information same as the information displayed on the display area each time the touched position of the screen is detected at the position where the change icon is displayed.

18. A method of displaying information, comprising: detecting a touched position of a screen, acquiring a plurality of information comprising some of:

navigational information acquired from a plotter device configured to plot a position of a ship on a nautical chart, radar information acquired from a radar device, underwater detection information acquired from a fish finder, image information acquired from a camera, weather information acquired from a weather observation device or the Internet, and metered information acquired from a nautical instrument, displaying the plurality of acquired information on a plurality of display areas dividing the screen, respectively displaying a change icon on one of the plurality of display areas, and sequentially changing the plurality of information assigned as changeable information in the one display area where the change icon is displayed, each time the touched position of the screen is detected at a position where the change icon is displayed.

19. A non-transitory computer-readable medium having stored thereon computer-executable instructions which, when executed by a computer, cause the computer to:

acquire a plurality of information, which are some of navigational information acquired from a plotter device configured to plot a position of a ship on a nautical chart, radar information acquired from a radar device, underwater detection information acquired from a fish finder, image information acquired from a camera, weather information acquired from a weather observation device or the Internet, and metered information acquired from a nautical instrument;

display the plurality of acquired information in a plurality of the divided display areas on the screen respectively;

display a change icon in one of the plurality of divided display areas; and sequentially change the acquired information to the one of information assigned as changeable information in the divided display area having the change icon, each time the touched position of the screen is detected at a position where the change icon is displayed.

* * * * *